US 8,477,841 B2

(12) United States Patent
Peng et al.

(10) Patent No.: US 8,477,841 B2
(45) Date of Patent: *Jul. 2, 2013

(54) VIDEO PROCESSING METHOD, ENCODING DEVICE, DECODING DEVICE, AND DATA STRUCTURE FOR FACILITATING LAYOUT OF A RESTORED IMAGE FRAME

(75) Inventors: Hsin-Yuan Peng, Taipei Hsien (TW); Chi-Cheng Chiang, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 719 days.

This patent is subject to a terminal disclaimer.

(21) Appl. No.: 12/624,221

(22) Filed: Nov. 23, 2009

(65) Prior Publication Data

US 2010/0158136 A1 Jun. 24, 2010

(30) Foreign Application Priority Data

Dec. 24, 2008 (TW) .............................. 97150441 A

(51) Int. Cl.
*H04N 7/12* (2006.01)
*H04N 11/02* (2006.01)
*H04N 11/04* (2006.01)

(52) U.S. Cl.
USPC ................... 375/240.02; 375/240; 348/384.1; 348/404.1; 370/465; 370/468

(58) Field of Classification Search
USPC . 375/240.01–240.29, 240; 382/276; 370/316, 370/395.1, 465, 468, 477; 348/384.1, 404.1, 348/424.2
See application file for complete search history.

(56) References Cited

U.S. PATENT DOCUMENTS

| 6,859,442 | B1 * | 2/2005 | Agarwal et al. | ............... 370/316 |
| 7,570,645 | B2 * | 8/2009 | Agarwal | .................... 370/395.1 |
| 8,250,618 | B2 * | 8/2012 | Rosenzweig et al. | ........... 725/96 |
| 2004/0240752 | A1 * | 12/2004 | Dobbs et al. | .................. 382/276 |
| 2007/0030911 | A1 * | 2/2007 | Yoon | ......................... 375/240.25 |

FOREIGN PATENT DOCUMENTS

| CN | 1466384 | 1/2004 |
| CN | 1571508 | 1/2005 |

* cited by examiner

*Primary Examiner* — Sath V Perungavoor
*Assistant Examiner* — Nathnael Aynalem
(74) *Attorney, Agent, or Firm* — Blakely, Sokoloff, Taylor & Zafman

(57) ABSTRACT

A video processing method is implemented by encoding and decoding devices. The video processing method includes: configuring the encoding device to decrease a resolution of a received at least one source image frame based on a received reference signal to obtain reduced image frame content with a reduced resolution, and to generate a relay image frame containing the reduced image frame content; configuring the encoding device to generate a header including at least one element containing information of the reduced image frame content, pack the relay image frame and the header into a video signal, and transmit the video signal to the decoding device; and configuring the decoding device to obtain a restored image frame from the reduced image frame content based on the element in the header. A data structure, and encoding and decoding devices are also disclosed.

13 Claims, 8 Drawing Sheets

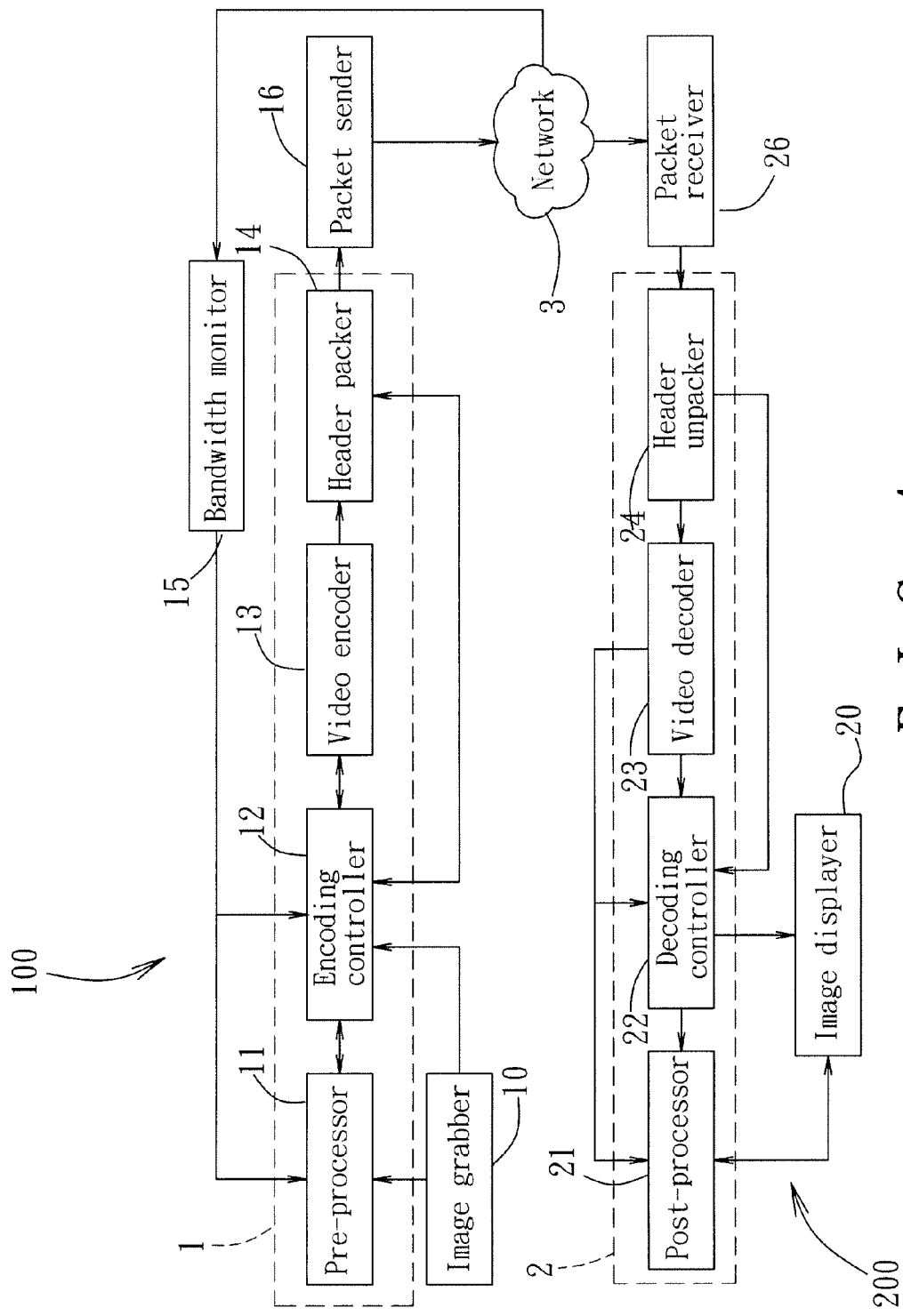
F I G. 4

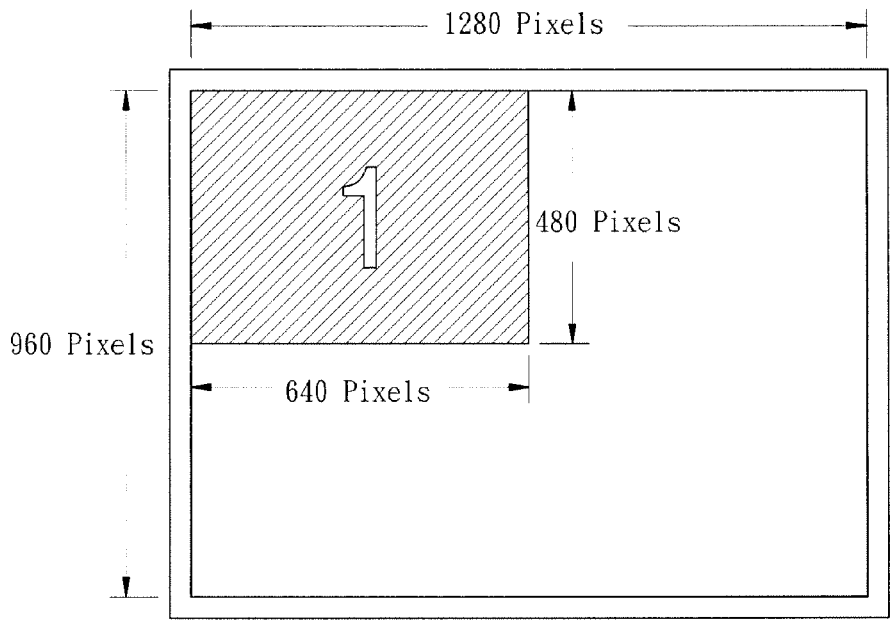
F I G. 6
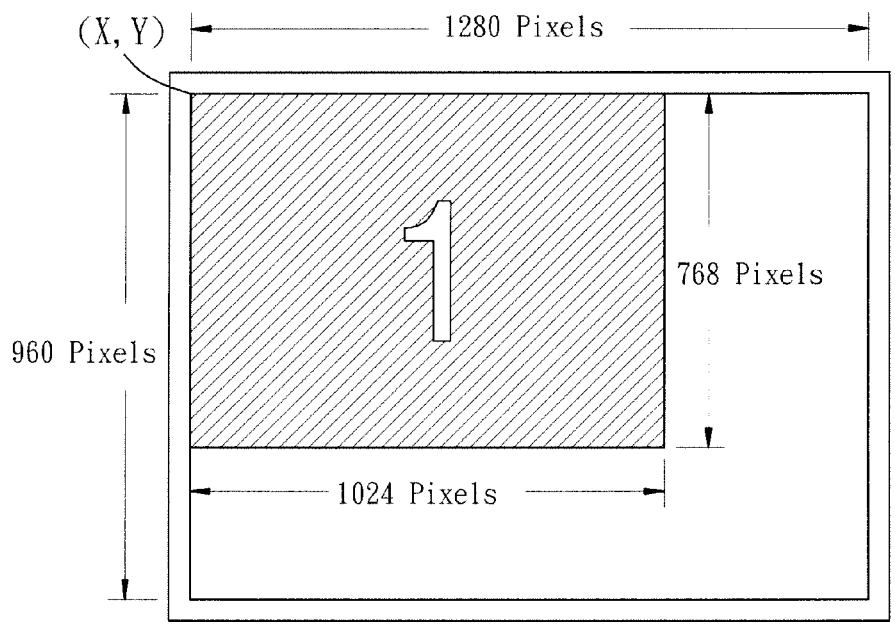
F I G. 7

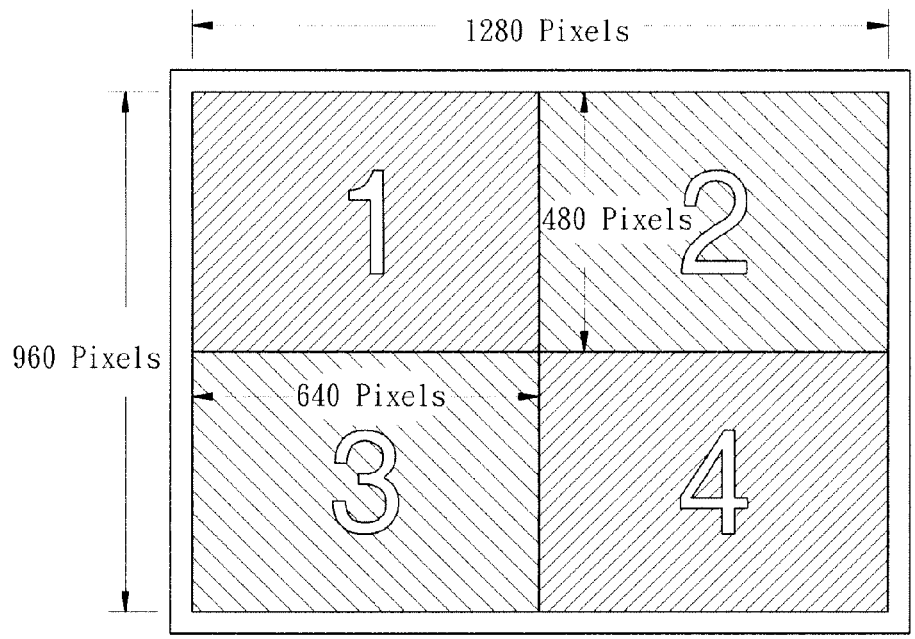
F I G. 8
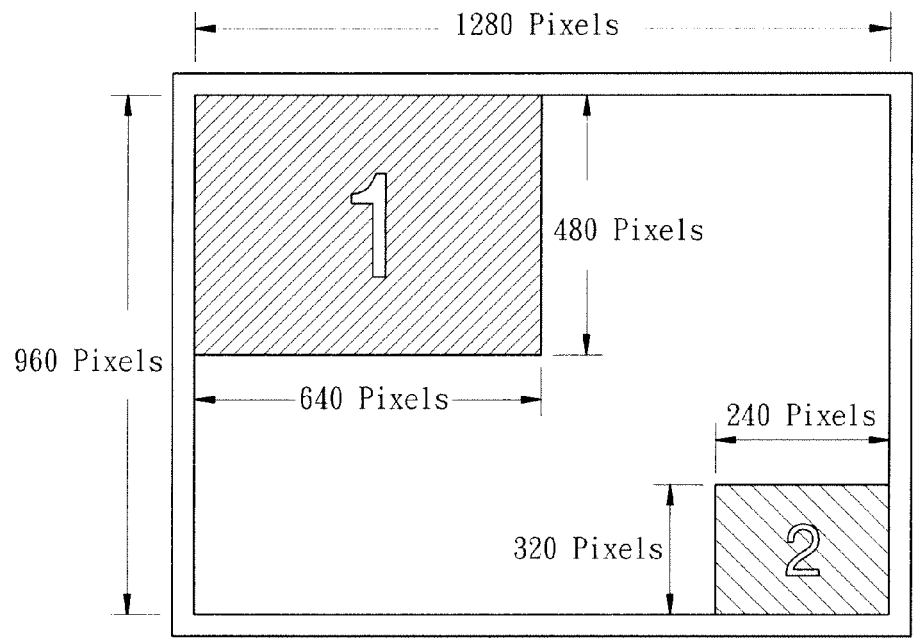
F I G. 9

VIDEO PROCESSING METHOD, ENCODING DEVICE, DECODING DEVICE, AND DATA STRUCTURE FOR FACILITATING LAYOUT OF A RESTORED IMAGE FRAME

CROSS-REFERENCE TO RELATED APPLICATION

This application claims priority of Taiwanese Application No. 097150441, filed on Dec. 24, 2008.

BACKGROUND OF THE INVENTION

1. Field of the Invention

The present invention relates to a video processing method, an encoding device, a decoding device, and a data structure for facilitating layout of a restored image frame.

2. Description of the Related Art

A conventional videoconference system, such as that shown in FIG. 1, is an example of a video processing system. A plurality of source image frames 9011~901n included in a real-time image sequence are compressed into video signals by a video encoder 91. The video signals are then transmitted via a network 8 to a video decoder 92. The video decoder 92 decodes the video signals for recovery into a series of output image frames 9021~902n.

In the conventional videoconference system, the entire process from inputting the source image frames 9011~901n into the video encoder 91 to transmitting the resulting signals via the network 8 for output to the video decoder 92 is conducted using a single fixed resolution. Therefore, if the bandwidth of the network 8 is abruptly reduced, and the encoding bit rate (data amount of each frame×frame rate) exceeds the bandwidth, this will result in intermittent and/or unclear pictures at the receiving end.

One conventional approach used to overcome this problem is that in which the resolution of the source image frames 9011~901n is initially set sufficiently low so that any unexpected drop in the bandwidth of the network 8 will not result in an encoding bit rate that exceeds the bandwidth. However, such an approach is not ideal since the resulting output image frames 9021~902n will be of a low quality. According to another conventional approach, bandwidth detection is performed prior to operation of the videoconference system, after which the resolution to be employed by the video encoder 91 is determined based on the detected bandwidth. However, no further adjustment in resolution is contemplated when such a technique is employed.

A conventional video monitor system is another example of a video processing system. In the conventional video monitor system, input is received typically from a plurality of image sources, and a video encoder with a fixed image resolution is used for each image source. The large number of video encoders involved in, for example, a 16- or 32-channel video monitor system (i.e., one video encoder for each channel) results in high system costs and complexity. Moreover, a separate bit stream is transmitted over a network for each video encoder, which is burdensome on the network. Finally, as with the conventional video conference system, the conventional video monitor system is unable to effectively cope with the problems associated with abrupt reductions in network bandwidth.

SUMMARY OF THE INVENTION

Therefore, the object of the present invention is to provide a video processing method, an encoding device, a decoding device, and a data structure for facilitating layout of a restored image frame.

According to a first aspect, the video processing method of this invention is implemented by an encoding device and a decoding device, the encoding device receiving at least one source image frame and a reference signal, the encoding device communicating with the decoding device.

The video processing method comprises: (a) configuring the encoding device to decrease a resolution of the source image frame on the basis of the reference signal to thereby obtain reduced image frame content with a reduced resolution, and to generate a relay image frame containing the reduced image frame content; (b) configuring the encoding device to generate a header including at least one element, pack the relay image frame generated in step (a) and the header into a video signal, and transmit the video signal to the decoding device, said at least one element containing information of the reduced image frame content in the relay image frame; and (c) configuring the decoding device to obtain a restored image frame from the reduced image frame content in the relay image frame, which is generated in step (a) and contained in the video signal generated in step (b), on the basis of said at least one element in the header generated in step (b).

According to a second aspect, the data structure of this invention is provided in a header for enabling a decoding device to obtain a restored image frame from reduced image frame content, which is generated by an encoding device by decreasing a resolution of a source image frame and which is packed in a relay image frame together with the header by the encoding device to form a video signal, the encoding device sending the video signal to the decoding device via a network.

The data structure includes at least one of: a bandwidth element containing information of a detected bandwidth of the network; a scale element containing information of a predetermined factor used to scale down the image frame content from the source image frame; a ratio element containing information of an exponent of the predetermined factor used to scale down the image frame content from the source image frame; a length element indicating a length of the reduced image frame content in number of pixels, and a width element indicating a width of the reduced image frame content in number of pixels; and an X-coordinate element indicating an X-coordinate of a predetermined location of the reduced image frame content in the relay image frame, and a Y-coordinate element indicating a Y-coordinate of the predetermined location of the reduced image frame content in the relay image frame.

In some embodiments, the encoding device receives a plurality of source image frames and decreases the resolution of each of the source image frames to thereby obtain a plurality of reduced image frame contents in the relay image frame. In such embodiments, the data structure of this invention further includes at least one of: a plurality of number elements that indicate relative positions of the reduced image frame contents, respectively, in the relay image frame; and a plurality of last image frame elements associated respectively with the reduced image frame contents in the relay image frame, each of the last image frame elements indicating whether or not the corresponding reduced image frame content is the last reduced image frame content in the relay image frame.

According to a third aspect, the encoding device for a video processing system of this invention communicates with a decoding device of the video processing system and comprises: an encoding controller for receiving at least one source image frame and a reference signal, the encoding controller decreasing a resolution of the source image frame on the basis of the reference signal to thereby obtain reduced image frame content with a reduced resolution, and generating a relay image frame containing the reduced image frame content; and a header packer coupled to the encoding controller to receive the relay image frame therefrom, the header packer generating a header including at least one element, packing the relay image frame and the header into a video signal, and transmitting the video signal to the decoding device, said at least one element containing information of the reduced image frame content in the relay image frame for use by the decoding device in obtaining a restored image frame from the reduced image frame content in the relay image frame.

According to a fourth aspect, the decoding device for a video processing system of this invention communicates with an encoding device of the video processing system and receives a video signal therefrom that has packed therein a relay image frame in a compressed state and a header, the header including at least one element which contains information of reduced image frame content in the relay image frame. The decoding device comprises: a header unpacker for unpacking the relay image frame and the header from the video signal; a video decoder coupled to the header unpacker, the video decoder decompressing the relay image frame output by the header unpacker; and a decoding controller coupled to the video decoder to receive the relay image frame in decompressed form therefrom, and to the header unpacker to receive the header from one of the video decoder and the header unpacker, the decoding controller obtaining a restored image frame from the reduced image frame content in the relay image frame on the basis of said at least one element in the header.

BRIEF DESCRIPTION OF THE DRAWINGS

Other features and advantages of the present invention will become apparent in the following detailed description of the preferred embodiment with reference to the accompanying drawings, of which:

FIG. 4 is a schematic block diagram, illustrating the video processing system of the preferred embodiment in greater detail;

FIG. 6 is a schematic diagram, illustrating a first example of a relay image frame generated by an encoding device of the video processing system of the preferred embodiment;

FIG. 7 is a schematic diagram, illustrating a second example of a relay image frame generated by the encoding device of the video processing system of the preferred embodiment;

FIG. 8 is a schematic diagram, illustrating a third example of a relay image frame generated by the encoding device of the video processing system of the preferred embodiment;

FIG. 9 is a schematic diagram, illustrating a fourth example of a relay image frame generated by the encoding device of the video processing system of the preferred embodiment;

DETAILED DESCRIPTION OF THE PREFERRED EMBODIMENT

Figure 1:
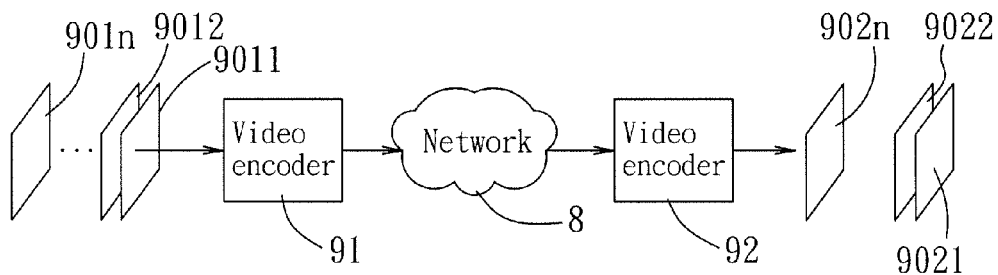
FIG. 1 is a schematic block diagram of a conventional video processing system.
Figure 2:
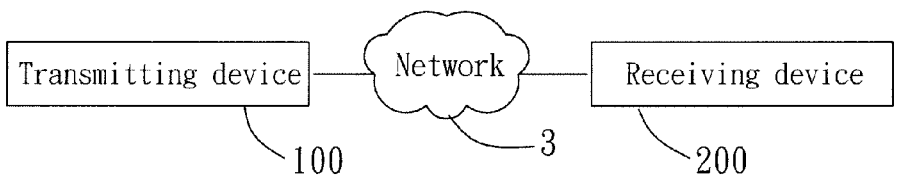
FIG. 2 is a schematic block diagram of a video processing system according to a preferred embodiment of the present invention.
Figure 3:
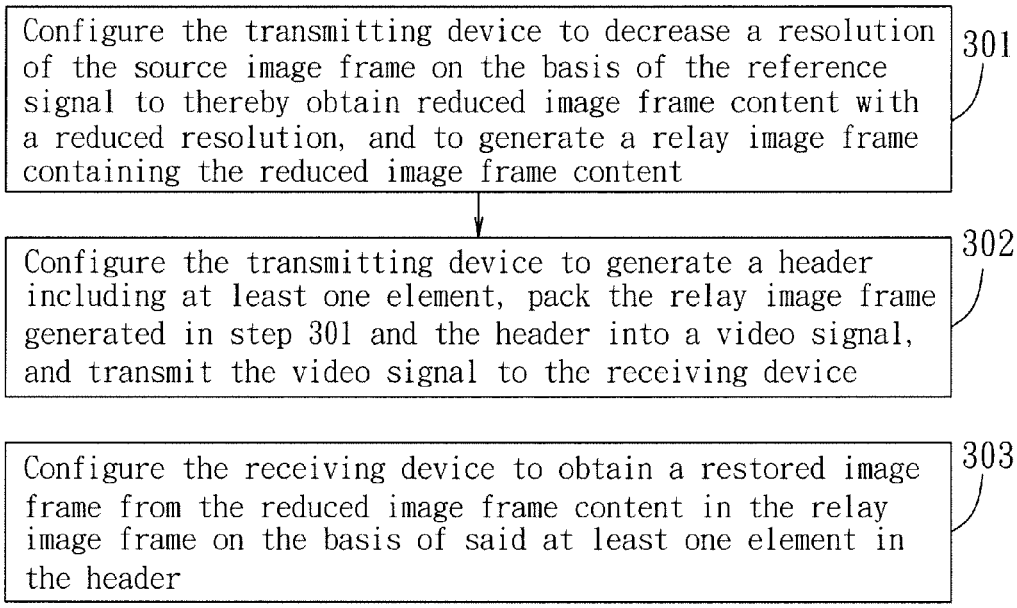
FIG. 3 is a flowchart of a video processing method according to a preferred embodiment of the present invention.

Referring to FIGS. 2 and 3, a video processing method according to a preferred embodiment of the present invention is implemented by an encoding device 100 and a decoding device 200 of a video processing system according to a preferred embodiment of the present invention. The encoding device 100 receives at least one source image frame and a reference signal, and communicates with the decoding device 200 via a network 3.

In step 301 of the video processing method, the encoding device 100 is configured to decrease a resolution of the source image frame on the basis of the reference signal to thereby obtain reduced image frame content with a reduced resolution, and to generate a relay image frame containing the reduced image frame content. In some embodiments, the reference signal is a detected bandwidth of the network 3, and in step 301, the encoding device 100 is configured to decrease the resolution of the source image frame when the bandwidth of the network 3 is less than a predetermined level. In other embodiments, the reference signal is a user command.

Next, in step 302, the encoding device 100 is configured to generate a header including at least one element, pack the relay image frame generated in step 301 and the header into a video signal, and transmit the video signal to the decoding device 200. The element in the header (i.e., said at least one element) contains information of the reduced image frame content in the relay image frame.

In step 303, the decoding device 200 is configured to obtain a restored image frame from the reduced image frame content in the relay image frame, which is generated in step 301 and contained in the video signal generated in step 302, on the basis of said at least one element in the header generated in step 302.

The video processing system according to the preferred embodiment of the present invention will now be described in greater detail with reference to FIG. 4.

The encoding device 100 includes an image grabber 10, a bandwidth monitor 15, an encoding module 1, and a packet sender 16. The encoding module 1 includes a pre-processor 11, an encoding controller 12, a video encoder 13, and a header packer 14.

The decoding device 200 includes a decoding module 2, an image displayer 20, and a packet receiver 26. The decoding module 2 includes a post-processor 21, a decoding controller 22, a video decoder 23, and a header unpacker 24.

The image grabber 10 obtains a source image frame from an image sequence, and outputs the source image frame. In one embodiment, the source image frame obtained by the image grabber 10 may have a resolution that is at a maximum level that the video encoder 13 and the video decoder 23 can handle (e.g., 1024×768 or 1920×1080).

The bandwidth monitor 15 monitors the available bandwidth of the network 3 and outputs a corresponding bandwidth detection signal. The bandwidth monitor 15 may be independent or a part of the encoding module 1.

The encoding controller 12 is coupled to the bandwidth monitor 15 to receive the bandwidth detection signal therefrom, and to the image grabber 10 to receive the source image frame therefrom. In the preferred embodiment, the bandwidth detection signal is the reference signal. However, in other embodiments, a user command is the reference signal, as described above. In the preferred embodiment, the encoding controller 12 decreases the resolution of the source image frame on the basis of the bandwidth detection signal to thereby obtain reduced image frame content with a reduced resolution, and generates a relay image frame containing the reduced image frame content. In the preferred embodiment, the encoding controller 12 decreases the resolution of the source image frame when the bandwidth detection signal indicates that the bandwidth of the network 3 is less than a predetermined level.

In some embodiments, the pre-processor 11 of the encoding module 1 is coupled to the bandwidth monitor 15 to receive the bandwidth detection signal therefrom, and to the image grabber 10 to receive the source image frame therefrom. In such embodiments, both the encoding controller 12 and the pre-processor 11 have the capability of decreasing the resolution of the source image frame.

The video encoder 13 of the encoding module 1 is coupled to the encoding controller 12 to receive the relay image frame therefrom, and is further coupled to the header packer 14. The video encoder 13 compresses the relay image frame and outputs the relay image frame in compressed form to the header packer 14.

In some embodiments, the video encoder 13 may be deactivated (i.e., "support deactivation control") so that the video encoder 13 does not compress the relay image frame. That is, in some embodiments, whenever the encoding controller 12 reduces the resolution of the source image frame, no compression is performed by the video encoder 13. When the video encoder 13 supports deactivation control, the encoding controller 12 may output the resulting relay image frame directly to the header packer 14 by bypassing the video encoder 13. In some embodiments, when the video encoder 13 does not support deactivation control, the encoding controller 12 pads the relay image frame with simple macroblocks and outputs the resulting relay image frame to the video encoder 13.

The header packer 14 is coupled to the encoding controller 12 and the video encoder 13. The header packer 14 receives the relay image frame from the video encoder 13, or alternatively, from the encoding controller 12 when the encoding controller 12 bypasses the video encoder 13 as described above. The header packer 14 generates a header containing a data structure that includes at least one element, packs the relay image frame and the header into a video signal, and outputs the video signal to the packet sender 16.

The packet sender 16 transmits the video signal to the decoding device 200 via the network 3.

The element in the data structure contained in the header, i.e., said at least one element, includes information of the reduced image frame content in the relay image frame for use by the decoding device 200 in obtaining a restored image frame from the reduced image frame content.

Figure 5:
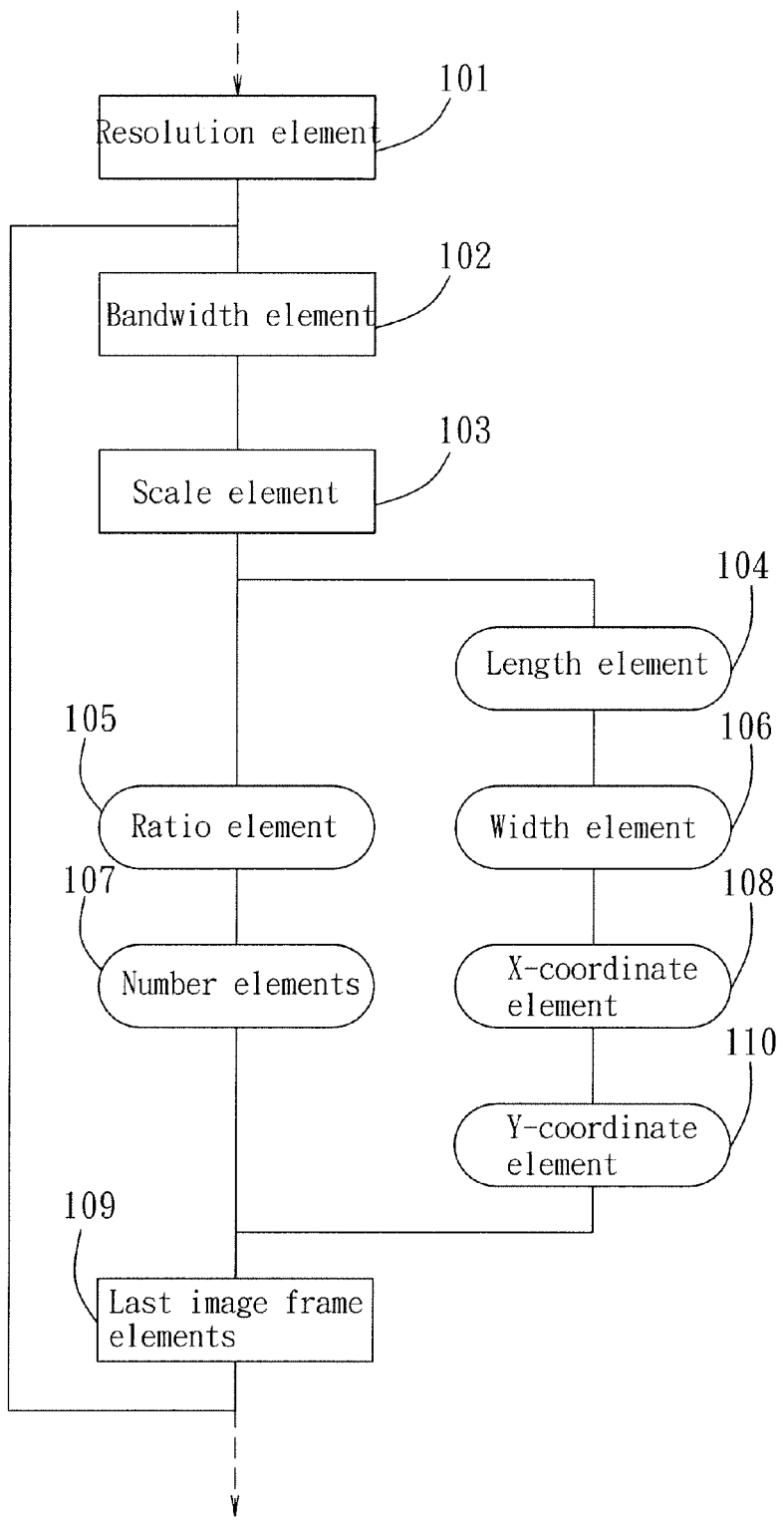
FIG. 5 is a schematic diagram, illustrating elements in a data structure according to a preferred embodiment of the present invention.

Referring to FIG. 5, said at least one element in the data structure contained in the header includes the following: a resolution element 101 which indicates whether automatic resolution adjustment is set; a bandwidth element 102 containing information of a detected bandwidth of the network 3; a scale element 103 containing information of a predetermined factor used to scale down the image frame content from the source image frame; a ratio element 105 containing information of an exponent of the predetermined factor used to scale down the image frame content from the source image frame; a length element 104 indicating a length of the reduced image frame content in number of pixels; a width element 106 indicating a width of the reduced image frame content in number of pixels; an X-coordinate element 108 indicating an X-coordinate of a predetermined location of the reduced image frame content in the relay image frame; and a Y-coordinate element 110 indicating a Y-coordinate of the predetermined location of the reduced image frame content in the relay image frame.

In some embodiments, the predetermined factor of the scale element 103 is $(1/k)^n$, in which (n) and (k) are positive integers. That is, in some embodiments, 1/k is the predetermined factor of the scale element 103, and (n) is the exponent of the predetermined factor forming the ratio element 105.

In some embodiments, the encoding controller 12 receives a plurality of source image frames from the image grabber 10 and decreases the resolution of each of the source image frames to thereby obtain a plurality of reduced image frame contents in the relay image frame. In such embodiments, said at least one element in the data structure contained in the header further includes the following: a plurality of number elements 107 that indicate relative positions of the reduced image frame contents, respectively, in the relay image frame; and a plurality of last image frame elements 109 associated respectively with the reduced image frame contents in the relay image frame, each of the last image frame elements indicating whether or not the corresponding reduced image frame content is the last reduced image frame content in the relay image frame.

No further reference will be made herein to FIG. 5 and the reference numerals for the elements in the data structure indicated therein.

Various examples of the relay image frame generated by the encoding controller 12, and the elements in the header generated by the header packer 14 will now be described with reference to FIGS. 6-10, in combination with FIG. 4.

Referring to FIGS. 6 and 7, two examples of relay image frames generated by the encoding controller 12 are shown. For these examples, it is assumed that the reference signal is the bandwidth detection signal and the encoding controller 12 decreases the resolution of the source image frame on the basis of the bandwidth detection signal. In other words, the encoding controller 12 operates automatically to decrease the resolution of the source image frame on the basis of the bandwidth detection signal. Furthermore, it is assumed that the predetermined factor of the scale element is ¼. The values of the elements containing information of the reduced image frame content in each of the relay image frames of FIGS. 6 and 7 are as shown in Table 1 below.

TABLE 1

| | FIG. 6 | | | FIG. 7 | |
|---|---|---|---|---|---|
| Element Name | Value | Explanation | Element name | Value | Explanation |
| Resolution element | 1 | Automatic adjustment | Resolution element | 1 | Automatic adjustment |
| Bandwidth element | 1 | Bandwidth factor | Bandwidth element | 1 | Bandwidth factor |
| Scale element | 1 | Scaling in powers of ¼ | Scale element | 0 | No scaling in powers of ¼ |
| Ratio element | 1 | Power of ¼ | Length element | 1024 | Designated length |
| Number element | 1 | Position number | Width element | 768 | Designated width |
| Last image frame element | 1 | Last one | X-coordinate element | 0 | X-pos 0 |

TABLE 1-continued

| FIG. 6 | | | FIG. 7 | | |
|---|---|---|---|---|---|
| Element Name | Value | Explanation | Element name | Value | Explanation |
| | | | Y-coordinate element | 0 | Y-pos 0 |
| | | | Last image frame element | 1 | Last one |

An explanation of the values for the elements corresponding to the relay image frame of FIG. 6 is as follows. Resolution element=1 indicates setting of automatic adjustment by the encoding controller 12 on the basis of the bandwidth detection signal (a value of 0 would indicate that automatic adjustment is not set). Bandwidth element=1 indicates that adjustment is caused by network bandwidth (0 would indicate that adjustment is not caused by network bandwidth). Scale element=1 indicates that the resolution of the source image frame is decreased (i.e., the source image is downsampled) to ¼ of the original size (0 would indicate downsampling is not performed to ¼ of the original size). Ratio element=1 indicates that the exponent of ¼ is 1. Number element=1 indicates that the reduced image frame content in the relay image frame of FIG. 6 is the first image frame content in the relay image frame. Last image frame element=1 indicates that the reduced image frame content in the relay image frame of FIG. 6 is the last image frame content in the relay image frame (0 would indicate that this is not the last image frame content in the relay image frame).

An explanation of the values for the elements corresponding to the relay image frame of FIG. 7 is as follows. Resolution element=1 indicates setting of automatic adjustment by the encoding controller 12 on the basis of the bandwidth detection signal. Bandwidth element=1 indicates that adjustment is caused by network bandwidth. Scale element=0 indicates that downsampling is not performed to ¼ of the original size of the source image frame. Length element=1024 indicates the length of the reduced image frame content in number of pixels. Width element=768 indicates the width of the reduced image frame content in number of pixels. X-coordinate=0 and Y-coordinate=0 indicate that the left top corner of the reduced image frame content is at position (0,0) of the relay image frame. Last image frame element=1 indicates that the reduced image frame content in the relay image frame of FIG. 7 is the last image frame content in the relay image frame.

In some embodiments, the encoding controller 12 determines whether the values of the elements in the header are reasonable. For instance, the encoding controller 12 may determine whether the length and width elements have values that exceed the original resolution of the source image frame (e.g., 1280×960).

As described above, in some embodiments, the encoding controller 12 receives a plurality of source image frames from the image grabber 10 and decreases the resolution of each of the source image frames to thereby obtain a plurality of reduced image frame contents in the relay image frame.

Referring to FIG. 8, an example is shown in which the encoding controller 12 receives four source image frames and decreases the resolution of each of the source image frames to thereby obtain four reduced image contents (1-4) in the relay image frame.

The values of the elements containing information of the reduced image frame contents (1-4) in the relay image frame of FIG. 8 are as shown in Table 2 below.

TABLE 2

| Reduced image frame content 1 | | Reduced image frame content 2 | |
|---|---|---|---|
| Element name | Value | Element name | Value |
| Resolution element | 1 | Resolution element | 1 |
| Bandwidth element | 0 | Bandwidth element | 0 |
| Scale element | 1 | Scale element | 1 |
| Ratio element | 1 | Ratio element | 1 |
| Number element | 1 | Number element | 2 |
| Last image frame element | 0 | Last image frame element | 0 |

| Reduced image frame content 3 | | Reduced image frame content 4 | |
|---|---|---|---|
| Element name | Value | Element name | Value |
| Resolution element | 1 | Resolution element | 1 |
| Bandwidth element | 0 | Bandwidth element | 0 |
| Scale element | 1 | Scale element | 1 |
| Ratio element | 1 | Ratio element | 1 |
| Number element | 3 | Number element | 4 |
| Last image frame element | 0 | Last image frame element | 1 |

An explanation of the values for the elements corresponding to the relay image frame of FIG. 8 is as follows. In this example, the scaling ratio is determined by the user, so the bandwidth element is 0. The source image frames are scaled to ¼ of their original sizes so the scale element and the ratio element both have values of 1. Moreover, the user decides to use four reduced image frame contents, i.e., the reduced image frame contents (1-4), to compose the relay image frame, so the header includes number elements and last image frame elements. In particular, the last image frame elements for the reduced image frame contents (1-3) are set to 0, which indicates that none of the reduced image frame contents (1-3) is the last reduced image frame content of the relay image frame, whereas the last image frame element of the reduced image frame content (4) is set to 1, which indicates that the reduced image frame content (4) is the last reduced image frame content of the relay image frame.

It is noted that, when the encoding controller 12 receives a plurality of source image frames, the present invention is not limited with respect to obtaining reduced image frame contents that are scaled to ¼ the size of the source image frames. For example, one reduced image frame content may be scaled to ¼ the size of the corresponding source image frame, and another reduced image frame content (or possibly a third reduced image frame content) may be scaled to 1/16 the size of the source image frame. In such a case, it is necessary only that the corresponding number elements be set such that the reduced image frame contents do not overlap one another.

FIG. 9 shows such an example in which reduced image frame content (1) is scaled to ¼ the size of the corresponding source image frame, and reduced image frame content (2) is scaled to 1/16 the size of the corresponding source image frame. Blank portions of the relay image frame may be filled with simple macroblocks by the encoding controller 12.

Table 3 below lists the values of the elements containing information of the reduced image frame contents (1, 2) in the relay image frame of FIG. 9.

TABLE 3

| Reduced image frame content 1 | | Reduced image frame content 2 | |
|---|---|---|---|
| Element name | Value | Element name | Value |
| Resolution element | 1 | Resolution element | 1 |
| Bandwidth element | 0 | Bandwidth element | 0 |
| Scale element | 1 | Scale element | 1 |
| Ratio element | 1 | Ratio element | 2 |
| Number element | 1 | Number element | 2 |
| Last image frame element | 0 | Last image frame element | 1 |

Figure 10:
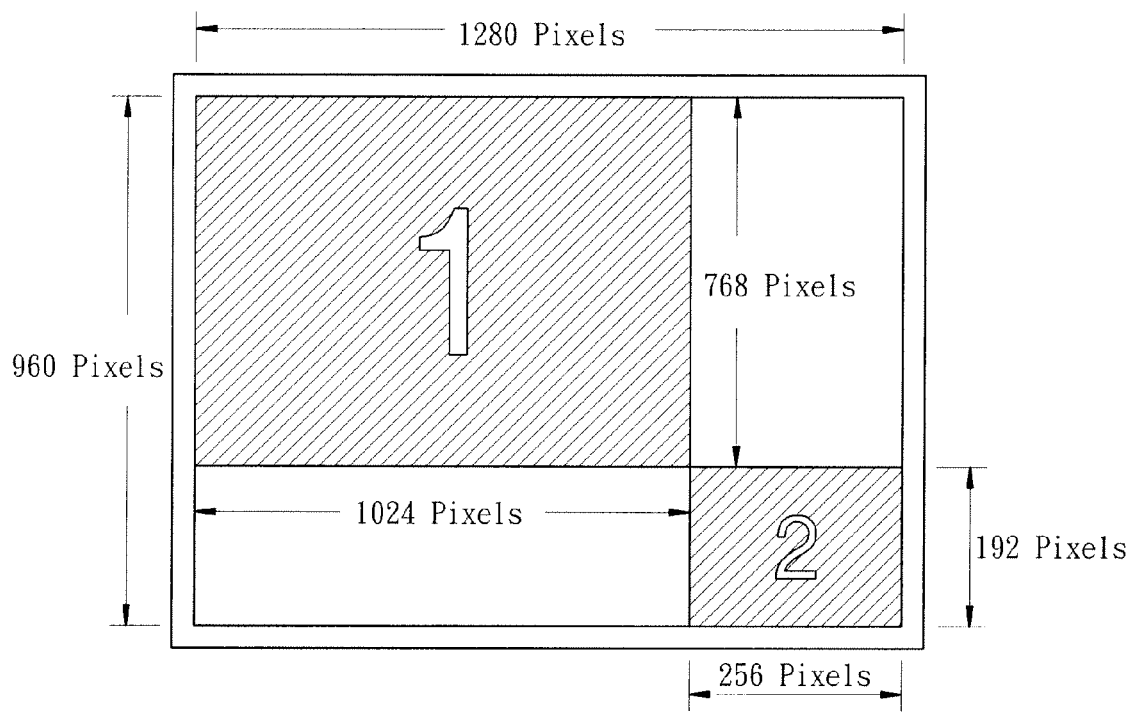
FIG. 10 is a schematic diagram, illustrating a fifth example of a relay image frame generated by the encoding device of the video processing system of the preferred embodiment.

Referring to FIG. 10, in this example, the scaling ratio is determined by the user, so the bandwidth elements are 0. Further, the reduced image frame contents are not scaled to ¼ of the corresponding source image frames, and hence, the scale elements have the value 0. Moreover, the length elements and the width elements indicate the sizes the user desires for the reduced image frame contents. Reduced image frame content (1) has 1024×768 pixels, and reduced image frame content (2) has 256×192 pixels. Hence, the length and width elements for the reduced image frame contents (1, 2) have the corresponding values. Further, the starting coordinate of the reduced image frame content (1) is (0,0) and the starting coordinate of the reduced image frame content (2) is (1024,768). Hence, the X-coordinate elements and the Y-coordinate elements for the reduced image frame contents (1, 2) have the corresponding values. Since the user decides to input two reduced image frame contents for the relay image frame, the last image frame element for the reduced image frame content (2) is 1.

Table 4 below lists the values of the elements containing information of the reduced image frame contents (1, 2) in the relay image frame of FIG. 10.

TABLE 4

| Reduced image frame content 1 | | Reduced image frame content 2 | |
|---|---|---|---|
| Element name | Value | Element name | Value |
| Resolution element | 1 | Resolution element | 1 |
| Bandwidth element | 0 | Bandwidth element | 0 |
| Scale element | 0 | Scale element | 0 |
| Length element | 1024 | Length element | 256 |
| Width element | 768 | Width element | 192 |
| X-coordinate element | 0 | X-coordinate element | 1024 |
| Y-coordinate element | 0 | Y-coordinate element | 768 |
| Last image frame element | 0 | Last image frame element | 1 |

The decoding device 200 will now be described in greater detail with reference to FIG. 4.

The packet receiver 26 receives the video signal from the packet sender 16 of the encoding device 100 via the network 3. The packet receiver 26 is coupled to the header unpacker 24 of the decoding module 2, and outputs the video signal to the header unpacker 24.

The header unpacker 24 is coupled to the video decoder 23 of the decoding module 2. The header unpacker 24 unpacks the relay image frame and the header from the video signal, and outputs the relay image frame and the header to the video decoder 23.

In some embodiments, the header unpacker 24 is further coupled to the decoding controller 22, and outputs the relay image frame and the header to the decoding controller 22 by bypassing the video decoder 23. For such embodiments, the video decoder 23 must support deactivation control, which was described above with respect to the video encoder 13. In still other embodiments, the header unpacker 24 outputs the relay image frame to the video decoder 23 and the header to the decoding controller 22.

The video decoder 23 is coupled to the header unpacker 24, and decompresses the relay image frame.

The decoding controller 22 is coupled to the video decoder 23, and to the header unpacker 24 in some embodiments. The decoding controller 22 receives each of the relay image frame and the header from one of the header unpacker 24 and the video decoder 23. The decoding controller 22 obtains a restored image frame from the reduced image frame content in the relay image frame on the basis of said at least one element in the header.

The decoding controller 22 is coupled to the image displayer 20, and outputs the restored image frame to the image displayer 20 for display on a screen (not shown) thereof.

In some embodiments, the decoding controller 22 is coupled to the post-processor 21, and outputs the restored image frame to the post-processor 21. In this case, the post-processor 21, which is coupled to the image displayer 20, increases the resolution of the restored image frame, after which the post-processor 21 outputs the resulting image frame to the image displayer 20 for display thereon. For example, the post-processor 21 may increase the resolution of the restored image frame from 640×480 to 1280×960, i.e., back to the original resolution of the source image frame.

If the image displayer 20 can support image frame inputs of different resolutions, then the post-processor 21 may be omitted from the configuration of the decoding module 2. However, it is noted that if the video decoder 23 does not support deactivation control, then the post-processor 21 is required for removing blank areas formed by simple macroblocks before enlargement or direct display on the image displayer 20.

It is to be noted that the video encoder 13 and the video decoder 23 form an encoding/decoding unit, and may be implemented using standard components, such as those complying with MPEG-4 (Moving Picture Experts Group) or H.264 standards. The video processing method of this invention does not alter the internal algorithms employed by the video encoder 13 or the video decoder 23.

Figure 11:
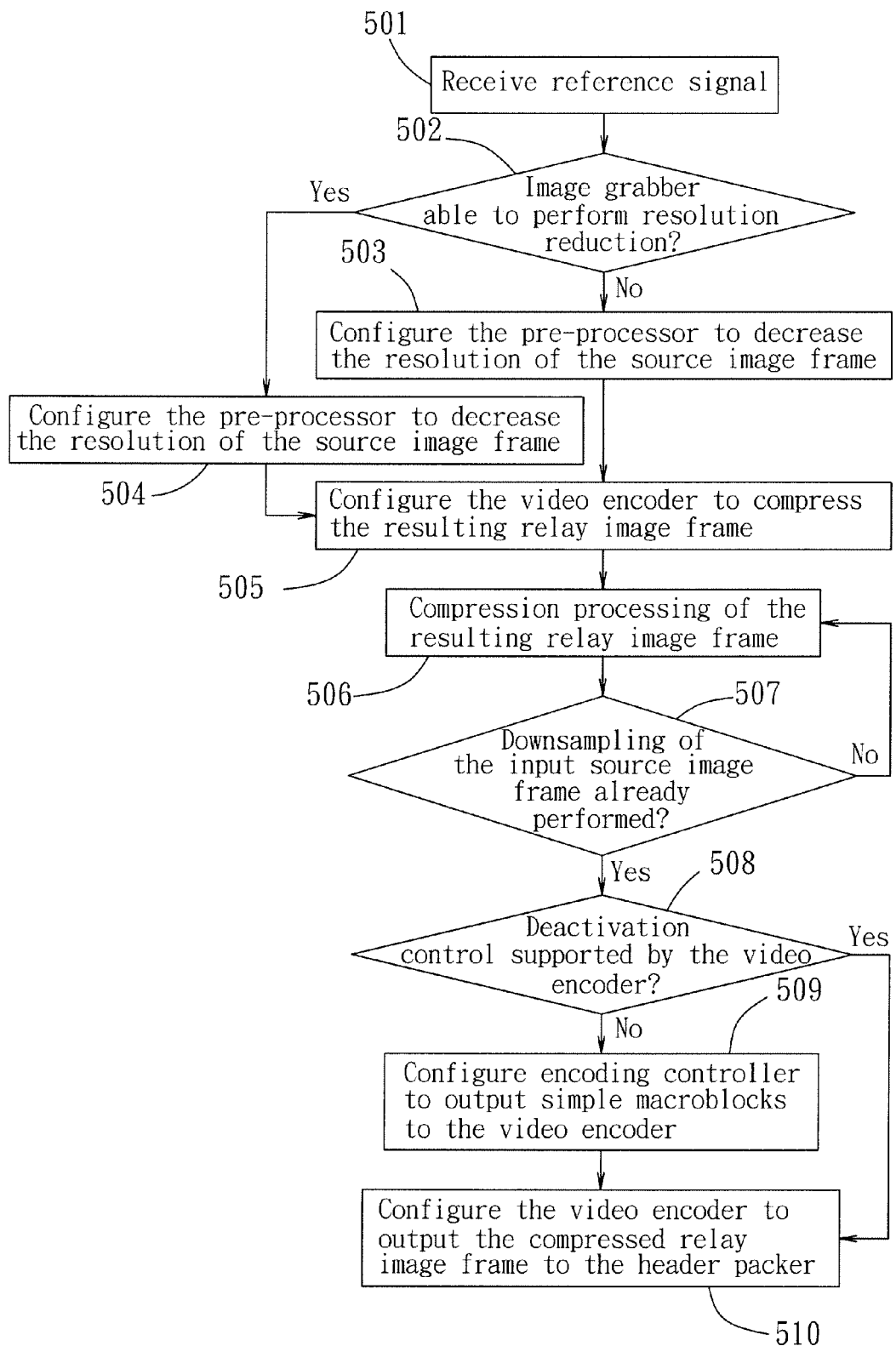
FIG. 11 is a flowchart of steps performed by the encoding device of the video processing system of the preferred embodiment according to one embodiment of the video processing method of the present invention.

FIG. 11 illustrates steps performed by the encoding device 100 according to one embodiment of the video processing method of the present invention.

First, in step 501, the encoding controller 12 receives a reference signal. In step 502, it is determined whether the image grabber 10 is able to perform resolution reduction. In the negative, the pre-processor 11 or the encoding controller 12 decreases the resolution of the source image frame (i.e., performs downsampling) in step 503. In the affirmative, the image grabber 10 performs resolution reduction in step 504.

Next, the video encoder 13 compresses the resulting relay image frame in step 505. In step 505, since the video encoder 13 has to simultaneously input the current frame and the previous frame(s) (of which there may be more than one, depending on the design of the video encoder 13), and since the current frame has already been downsampled, the previous frame(s) also has to be downsampled.

The encoding controller 12 retrieves the previous frame temporarily stored in the video encoder 13, and performs downsampling of the previous frame in a manner corresponding to the current frame so that accurate results are obtained by the video encoder 13. Moreover, the encoding controller 12 also sends commands to the header packer 14 so that when the header packer 14 packs the bit streams output from video encoder 13, this is done according to the source To effectively minimize resources and computation time, during compression operation of the video encoder 13 in step 506, it is determined, in step 507, whether downsampling of the input source image frame has already been performed. In the affirmative, the encoding controller 12 will inform the video encoder 13 that compression has already been performed. Next, in step 508, it is determined whether deactivation control is supported by the video encoder 13. In the affirmative (such as in the case of an ordinary software video compression module), compression is interrupted, and the relay image frame, which has already been compressed, is output to the header packer 14 in step 510. In the negative (such as in the case of an ordinary hardware video compression module), the encoding controller 12 outputs simple macroblocks that are all black or all white to the video encoder 13 in step 509, and the video encoder 13 outputs the compressed relay image frame to the header packer 14 for packing in step 510.

Figure 12:
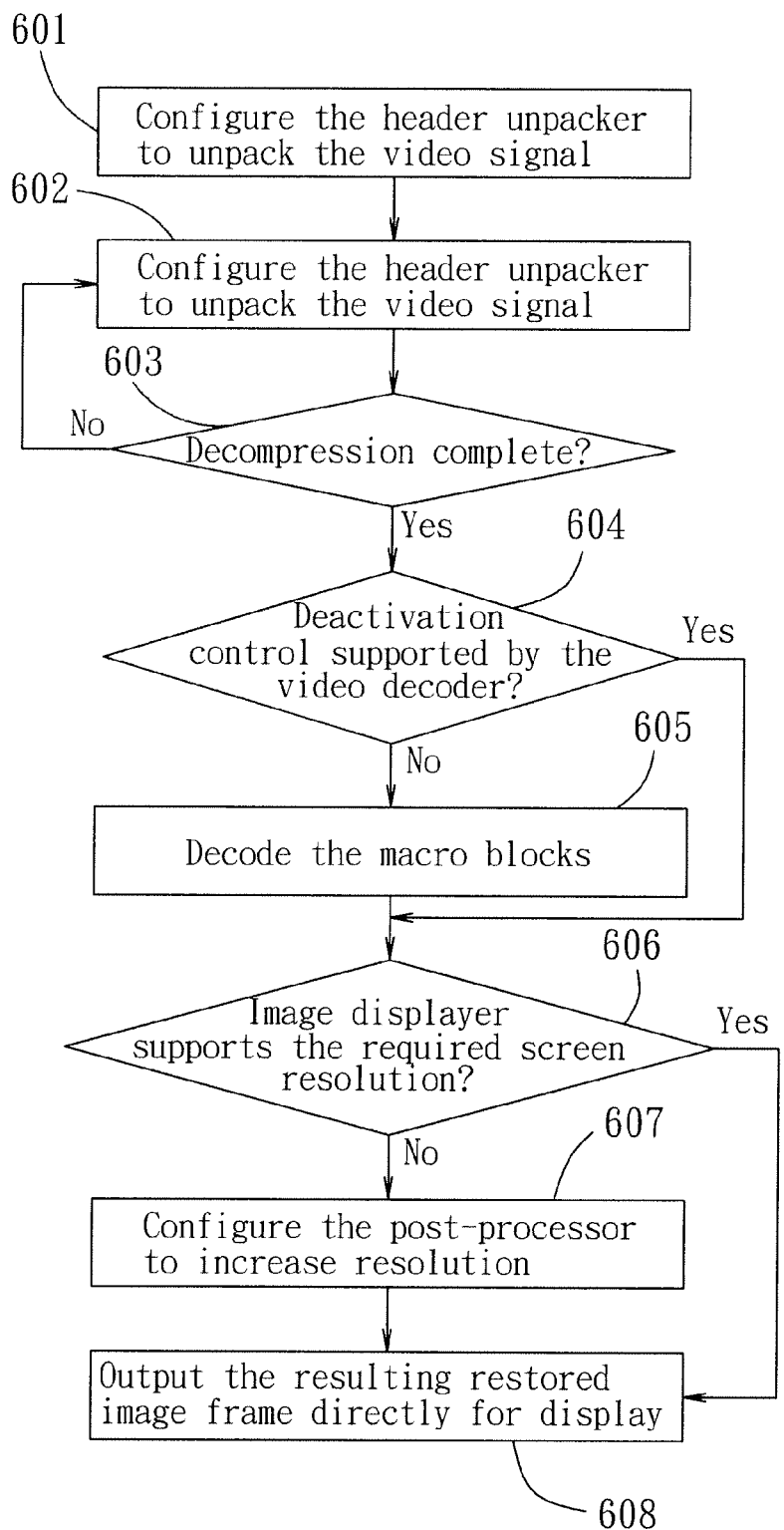
FIG. 12 is a flowchart of steps performed by a decoding device of the video processing system of the preferred embodiment according to one embodiment of the video processing method of the present invention.

FIG. 12 illustrates steps performed by the decoding device 200 according to one embodiment of the video processing method of the present invention.

First, in step 601, the header unpacker 24 unpacks the video signal. Next, in step 602, the video decoder 23 performs decompression. In step 603, it is determined whether decompression is completed. In the negative, the flow returns to step 602. In the affirmative, it is determined whether deactivation control is supported by the video decoder 2 in step 604. In the negative, decoding of the macro blocks is continued in step 605, after which step 606 is performed. In the affirmative, it is determined whether the image displayer 20 supports the required screen resolution in step 606. In the negative, the post-processor 21 is used to increase resolution in step 607. In the affirmative, the resulting restored image frame is directly output for display in step 608.

In sum, the video processing method, the encoding and decoding devices, and the data structure according to the present invention have the following advantages:

1. The resolution of the source image frames may be decreased as needed, such as when the bandwidth of the network 3 is abruptly reduced. Therefore, the resolution of the source image frames can be initially set high, and lowered on a frame-by-frame basis only as needed.

2. Through use of the elements included in the header, which is packed together with the relay image frame, only the single encoding module 2 is needed for multiple source image frames. Hence, system costs and complexity are reduced. Moreover, since a separate bit stream for each of a plurality of encoders is not generated, as in the case of conventional video monitor systems, the burden on the network 3 is reduced.

3. Various different applications of the present invention are possible through the flexibility provided in the size and positioning of the plurality of reduced image frame contents in the relay image frame.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A video processing method comprising:
   (a) configuring an encoding device to decrease a resolution of a received at least one source image frame on the basis of a received reference signal to thereby obtain reduced image frame content with a reduced resolution, and to generate a relay image frame containing the reduced image frame content;
   (b) configuring the encoding device to generate a header including at least one element, pack the relay image frame and the header into a video signal, and transmit the video signal to a decoding device, said at least one element containing information of the reduced image frame content in the relay image frame; and
   (c) configuring the decoding device to obtain a restored image frame from the reduced image frame content in the relay image frame on the basis of said at least one element in the header;
   wherein, in step (a), the resolution of the source image frame is decreased such that a size of the image frame content is scaled down from the source image frame by a predetermined factor, and in step (b), said at least one element includes the predetermined factor, and wherein the predetermined factor is $(1/k)^n$ where (n) and (k) are positive integers.

2. The video processing method of claim 1, wherein, in step (a), the encoding device is configured to decrease the resolution of the source image frame when a bandwidth of a network via which the encoding device communicates with the decoding device is less than a predetermined level.

3. The video processing method of claim 1, wherein, in step (b), said at least one element includes a resolution element containing information of the reduced resolution of the reduced image frame content.

4. The video processing method of claim 1, wherein, in step (a), the encoding device is configured to decrease the resolution of each of a plurality of received source image frames according to the reference signal to thereby obtain a plurality of reduced image frame contents each with a reduced resolution, and the encoding device is configured to generate the relay image frame containing the reduced image frame contents; and
   in step (b), said at least one element in the header includes a plurality of number elements that indicate relative positions of the reduced image frame contents, respectively, in the relay image frame; and
   in step (c), the decoding device is configured to obtain a restored image frame including a plurality of restored image frame contents corresponding respectively to the reduced image frame contents in the relay image frame at least on the basis of the number elements.

5. The video processing method of claim 1, wherein, in step (b), said at least one element includes a length element indicating a length of the reduced image frame content in number of pixels, and a width element indicating a width of the reduced image frame content in number of pixels.

6. The video processing method of claim 1, wherein, in step (b), said at least one element includes an X-coordinate element indicating an X-coordinate of a predetermined location of the reduced image frame content in the relay image frame, and a Y-coordinate element indicating a Y-coordinate of the predetermined location of the reduced image frame content in the relay image frame.

7. The video processing method of claim 1, wherein, in step (a), the encoding device is configured to decrease the resolution of each of a plurality of received source image frames according to the reference signal to thereby obtain a plurality of reduced image frame contents each with a reduced resolution, and the encoding device is configured to generate the relay image frame containing the reduced image frame contents; and in step (b), said at least one element in the header includes a plurality of last image frame elements associated respectively with the reduced image frame contents in the relay image frame, each of the last image frame elements indicating whether or not the corresponding reduced image frame content is the last reduced image frame content in the relay image frame;

in step (c), the decoding device is configured to obtain a restored image frame including a plurality of restored image frame contents corresponding respectively to the reduced image frame contents in the relay image frame at least on the basis of the last image frame elements.

8. An encoding device comprising:

an encoding controller for receiving at least one source image frame and a reference signal, said encoding controller decreasing a resolution of the source image frame on the basis of the reference signal to thereby obtain reduced image frame content with a reduced resolution, and generating a relay image frame containing the reduced image frame content;

a header packer generating a header including at least one element, packing the relay image frame and the header into a video signal, and transmitting the video signal to a decoding device, said at least one element containing information of the reduced image frame content in the relay image frame for use by the decoding device in obtaining a restored image frame from the reduced image frame content in the relay image frame; and a video encoder for compressing the relay image frame when receiving the same from said encoding controller;

wherein said encoding controller pads the relay image from with simple macroblocks and outputs the resulting relay image frame to said video encoder when said video encoder does not support deactivation control, and said encoding controller outputs the relay image frame to said header packer when said video encoder does support deactivation control.

9. The encoding device of claim 8, further comprising a bandwidth monitor for detecting a bandwidth of a network through which said encoding device communicates with the decoding device, and outputting a corresponding bandwidth detection signal to said encoding controller, said encoding controller decreasing the resolution of the source image frame when the bandwidth of the network is less than a predetermined level.

10. The encoding device of claim 8, wherein said at least one element in the header generated by said header packer includes:

a bandwidth element containing information of a detected bandwidth of the network;

a scale element containing information of a predetermined factor used to scale down the image frame content from the source image frame;

a ratio element containing information of an exponent of the predetermined factor used to scale down the image frame content from the source image frame;

a length element indicating a length of the reduced image frame content in number of pixels, and a width element indicating a width of the reduced image frame content in number of pixels; and an X-coordinate element indicating an X-coordinate of a predetermined location of the reduced image frame content in the relay image frame, and a Y-coordinate element indicating a Y-coordinate of the predetermined location of the reduced image frame content in the relay image frame.

11. The encoding device of claim 10, wherein said encoding controller receives a plurality of source image frames and decreases the resolution of each of the source image frames to thereby obtain a plurality of reduced image frame contents in the relay image frame, and said at least one element in the header generated by said header packer further includes:

a plurality of number elements that indicate relative positions of the reduced image frame contents, respectively, in the relay image frame; and a plurality of last image frame elements associated respectively with the reduced image frame contents in the relay image frame, each of the last image frame elements indicating whether or not the corresponding reduced image frame content is the last reduced image frame content in the relay image frame.

12. A decoding device communicating with an encoding device and receiving a video signal therefrom that has packed therein a relay image frame in a compressed state and a header, the header including at least one element which contains information of reduced image frame content in the relay image frame, said decoding device comprising:

a header unpacker for unpacking the relay image frame and the header from the video signal;

a video decoder for decompressing the relay image frame output by the header unpacker; and a decoding controller for receiving the header from one of said video decoder and said header unpacker, said decoding controller obtaining a restored image frame from the reduced image frame content in the relay image frame on the basis of said at least one element in the header;

wherein said at least one element in the header based on which said decoding controller obtains the restored image frame includes:

a bandwidth element containing information of a detected bandwidth of the network;

a scale element containing information of a predetermined factor used to scale down the image frame content from the source image frame;

a ratio element containing information of an exponent of the predetermined factor used to scale down the image frame content from the source image frame;

a length element indicating a length of the reduced image frame content in number of pixels, and a width element indicating a width of the reduced image frame content in number of pixels; and an X-coordinate element indicating an X-coordinate of a predetermined location of the reduced image frame content in the relay image frame, and a Y-coordinate element indicating a Y-coordinate of the predetermined location of the reduced image frame content in the relay image frame.

13. The decoding device of claim 12, wherein said at least one element contains information of a plurality of reduced image frame contents in the relay image frame, and said decoding controller obtains the restored image frame from the plurality of the reduced image frame contents on the basis of said at least one element which further includes:

a plurality of number elements that indicate relative positions of the reduced image frame contents, respectively, in the relay image frame; and a plurality of last image frame elements associated respectively with the reduced image frame contents in the relay image frame, each of the last image frame elements indicating whether or not the corresponding reduced image frame content is the last reduced image frame content in the relay image frame.

* * * * *

UNITED STATES PATENT AND TRADEMARK OFFICE
CERTIFICATE OF CORRECTION

PATENT NO.        : 8,477,841 B2                              Page 1 of 1
APPLICATION NO.   : 12/624221
DATED             : July 2, 2013
INVENTOR(S)       : Hsin-Yuan Peng and Chi-Cheng Chiang It is certified that error appears in the above-identified patent and that said Letters Patent is hereby corrected as shown below:

In the Claims

Column 13, Claim 8, line 33, please delete "from" and insert --frame--.

Signed and Sealed this
First Day of October, 2013

Teresa Stanek Rea
*Deputy Director of the United States Patent and Trademark Office*